United States Patent [19]
Inayoshi et al.

[11] Patent Number: 5,251,963
[45] Date of Patent: Oct. 12, 1993

[54] VEHICULAR LONG CRUISING SEAT

[75] Inventors: Masatoshi Inayoshi, Atsugi; Kuniyoshi Date; Shinya Iwasaki, both of Yokohama, all of Japan

[73] Assignee: Nissan Motor Co., Ltd., Yokohama, Japan

[21] Appl. No.: 941,854

[22] Filed: Sep. 8, 1992

Related U.S. Application Data

[63] Continuation of Ser. No. 622,101, Dec. 3, 1990, abandoned, which is a continuation-in-part of Ser. No. 252,337, Oct. 3, 1988, abandoned.

[51] Int. Cl.⁵ .......................... A47C 7/18; A47C 7/46
[52] U.S. Cl. .................................. 297/460; 297/457; 297/458; 297/452.21; 297/452.12
[58] Field of Search .......... 297/284.3, 284.8, 457–460, 297/284.4, 284.1

[56] References Cited

U.S. PATENT DOCUMENTS

| | | | |
|---|---|---|---|
| 2,549,902 | 4/1951 | Hibbard et al. | 297/284 B |
| 3,288,525 | 11/1966 | Cerf | 297/460 |
| 3,389,935 | 6/1968 | Getz et al. | 297/458 X |
| 3,596,990 | 8/1971 | Gottfried et al. | 297/284.8 |
| 3,778,104 | 12/1973 | Kusters | 297/458 |
| 3,990,742 | 11/1976 | Glass et al. | 297/284.3 |
| 4,637,652 | 1/1987 | Sperr | 297/458 |
| 4,668,015 | 5/1987 | Kjersem | 297/458 |

FOREIGN PATENT DOCUMENTS 1-94043 4/1989 Japan.

Primary Examiner—Peter R. Brown
Attorney, Agent, or Firm—Pennie & Edmonds

[57] ABSTRACT

A long drive seat comprises a seat back and a seat cushion which the seat back extends from. The seat is provided with a coccygeal vertebra movement restrainer constructed and arranged so as to restrain movement of a coccygeal vertebra of a spine of the seat occupant.

1 Claim, 15 Drawing Sheets

VEHICULAR LONG CRUISING SEAT

STATUS OF THE APPLICATION

This is a file wrapper continuation, of application Ser. No. 07/622,101, filed Dec. 3, 1990, now abandoned, which is a continuation-in-part application of U.S. patent application Ser. No. 07/252,337 filed on Oct. 3, 1988, now abandoned.

BACKGROUND OF THE INVENTION

The present invention relates to a seat for supporting a seat occupant in a vehicle, and more particularly to a vehicular seat which does not cause a seat occupant to feel fatigue during a long vehicle cruising.

JP-UM 51-112707 discloses a seat designed to support a seat occupant without causing him/her to feel fatigue. This known seat includes, a seat back provided with a lumbar support and a seat cushion which the seat back extends from. The seat cushion has substantially flat surface.

If this known seat is used as a vehicular seat, since the seat cushion has substantially flat surface, a hip point of a seat occupant slips forward during a long vehicle cruising. As a result, a spine of the seat occupant is subject to stress, causing the seat occupant to feel pain at the spine and to feel great fatigue.

An object of the present invention is to provide a seat for supporting a seat occupant in a vehicle, which seat does not cause the seat occupant to feel fatigue during a long vehicle cruising.

SUMMARY OF THE INVENTION

According to the present invention, there is provided a seat for supporting a seat occupant in a vehicle, comprising:
 a seat back;
 a seat cushion which said seat back extends from; and
 a coccygeal vertebra movement restrainer which includes a plurality of fixed supports, each extending in a substantially continuous fashion laterally across a portion of either of said seat back and seat cushion so as to restrain movement of a coccygeal vertebra of the spine of the seat occupant relative to sa seat cushion.

DETAILED DESCRIPTION OF THE INVENTION

Figure 1:
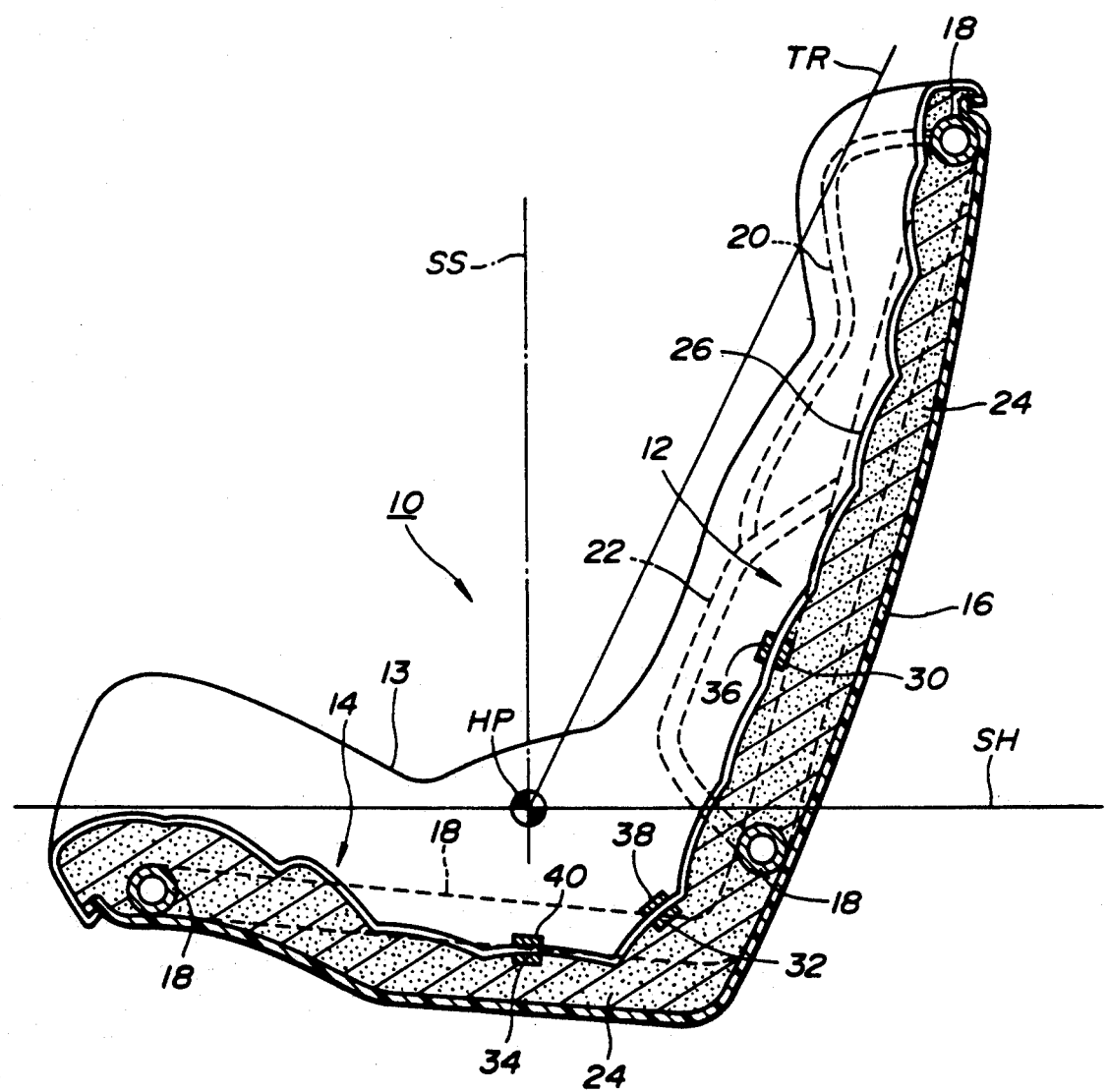
FIG. 1 is a section of first embodiment of a seat according to the present invention taken through a vertical reference plane involving a hip point of a seat occupant.
Figure 2:
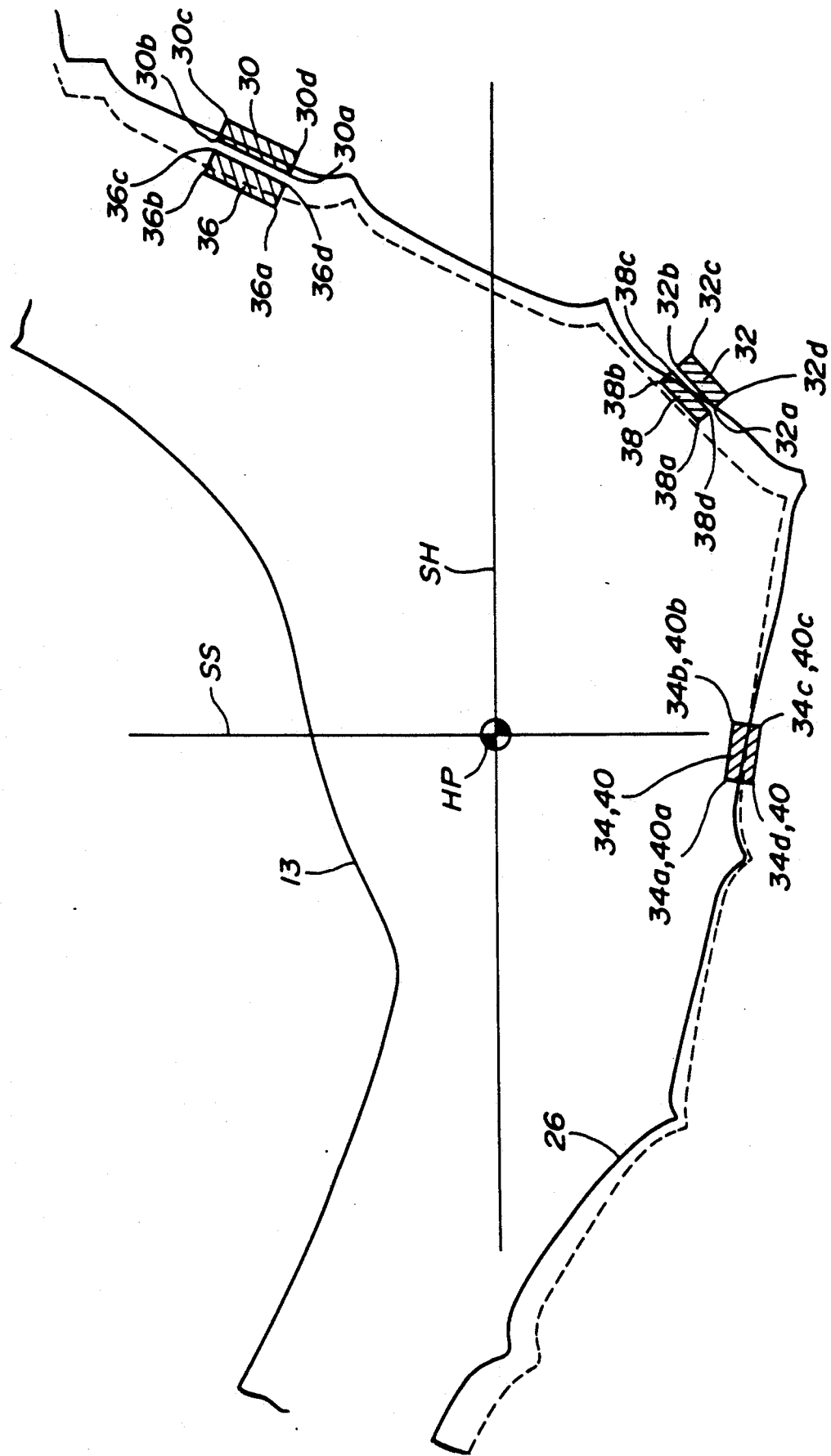
FIG. 2 is an enlarged schematic view of a portion of the first embodiment showing in shadow first to six closed boundaries where the coccygeal vertebra movement restrainer supports the seat occupant.
Figure 3:
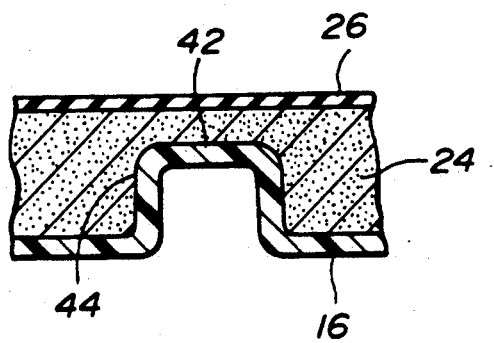
FIG. 3 is a fragmentary section of the seat showing the construction of each of the supports.

Referring to FIGS. 1 to 3, a first embodiment of a seat, generally designated by the reference numeral 10, for supporting a seat occupant in a racing car. The seat 10 generally comprises a seat back 12, a seat cushion 14 which the seat back extends from and a side support, only one being shown at 13. More specifically, the seat 10 comprises a pan frame 16 of a fiber reinforced plastic (FRP) defining a back of the seat back 12 and a bottom of the seat cushion 14. Secured to the pan frame 16 is a frame 18 constructed of a plurality of curved pipes. Extending from side portions of the seat back 12 are side frame pipes with a relatively narrow diameter, only side frame pipes extending from one side portion of the seat back 12 being shown by broken line and designated by the reference numerals 20 and 22. The frame 18 and side frame pipes 20 and 22 are covered with a pad 24 of a polyurethan foam with a skin 26 thereon.

The seat 10 is provided with a coccygeal vertebra movement restrainer. The coccygeal vertebra movement restrainer includes a plurality of supports which are disposed within areas having closed shadowed boundaries 30, 32, 34, 36, 38 and 40. Also shown in FIG. 1 are a hip point HP, specified as the H-point by the Society of Automotive Engineers Standard SAE J826 and labelled for the remainder of this disclosure as "HP", a vertical reference line SS intersecting the hip point HP, a horizontal reference line SH, and a torso line TR. The vertical and horizontal reference lines SS and SH, and torso line TR are disposed in the reference vertical plane as the hip point HP is.

The plurality of supports of the coccygeal vertebra movement restrainer may be divided into three, namely first, second and third. The first support is arranged in the seat back 12 and extends through closed boundaries 30 and 36 for supporting a waist portion of the seat occupant. The second support is arranged in the seat cushion 14 and extends through the closed boundaries 32 and 38 for supporting a portion adjacent a coccygeal vertebra of the seat occupant. The third support is arranged in the seat cushion 14 within the closed boundaries 34 and 40 for supporting thighs of the seat occupant.

As shown in FIG. 3, each of the supports is defined by a top 42 of a projection 44 formed by inwardly projecting a portion of the pan frame 16 toward the skin 26. The area and shape of the top 42a may differ from one support to another. A portion of the pad 24 disposed between the skin 26 and the top 42 of the projection 44 is compressed so that with the same load applied on the skin 26, a portion of the skin 26 above the top 42 of the projection 44 is less deformed inward than the adjacent other portion is deformed inward. More specifically, the load required to deform the skin 26 inward by a depth that is 25% of the unstressed thickness of the pad 24 is 25 kg at the portion of the skin 26 above the top 42 of the projection 44, while it ranges from 16 kg to 18 kg at the other portion where the projection is not provided. For example, if the unstressed thickness is 20 mm, the depth by which the skin 26 is deformed inward is 5 mm.

Figure 3A:
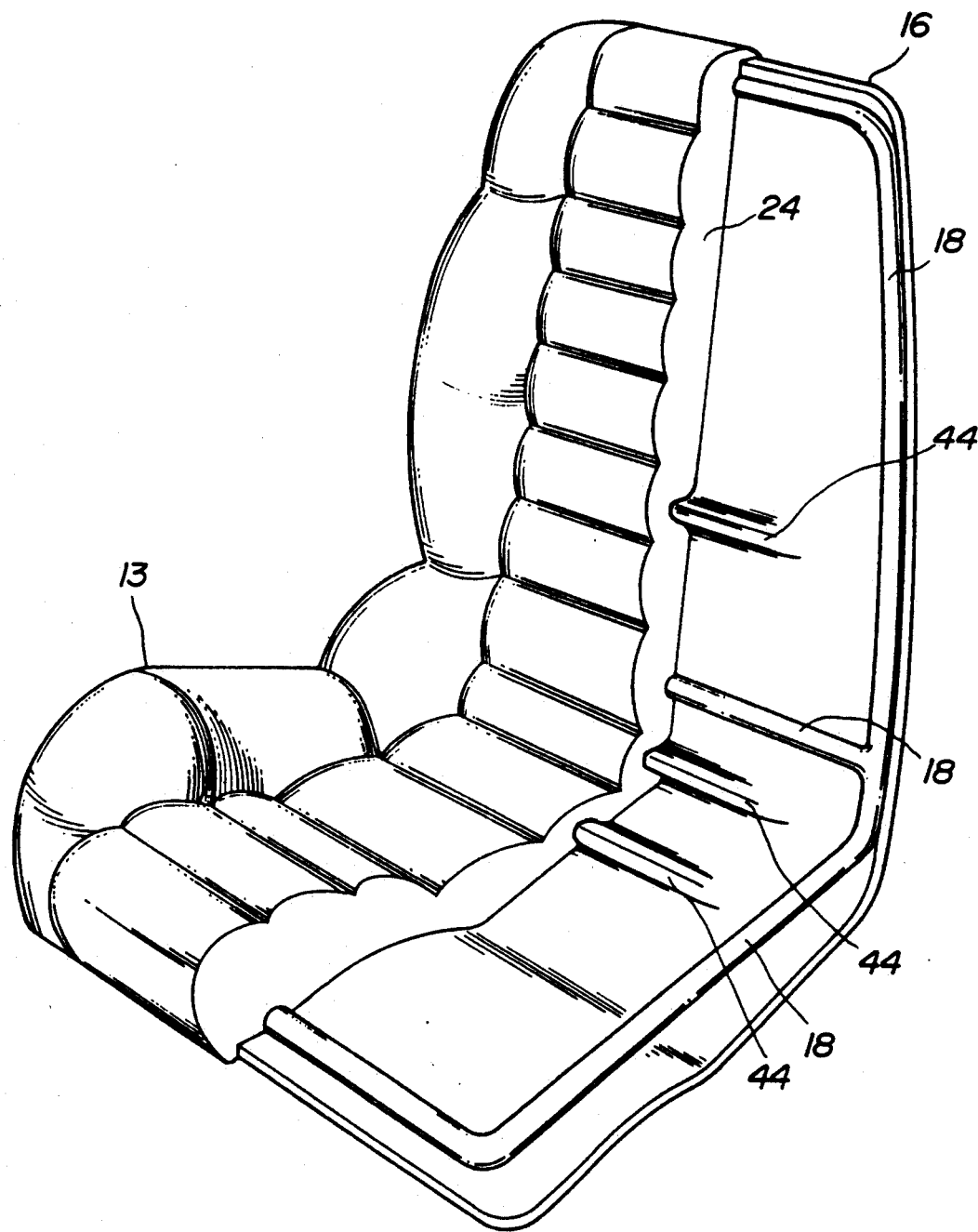
FIG. 3A is a perspective view of a seat with a pad partly removed and side frames removed to show a coccygeal vertebra movement restrainer employing a plurality of supports each in the form of the protrusions as shown in FIG. 3.
Figure 3B:
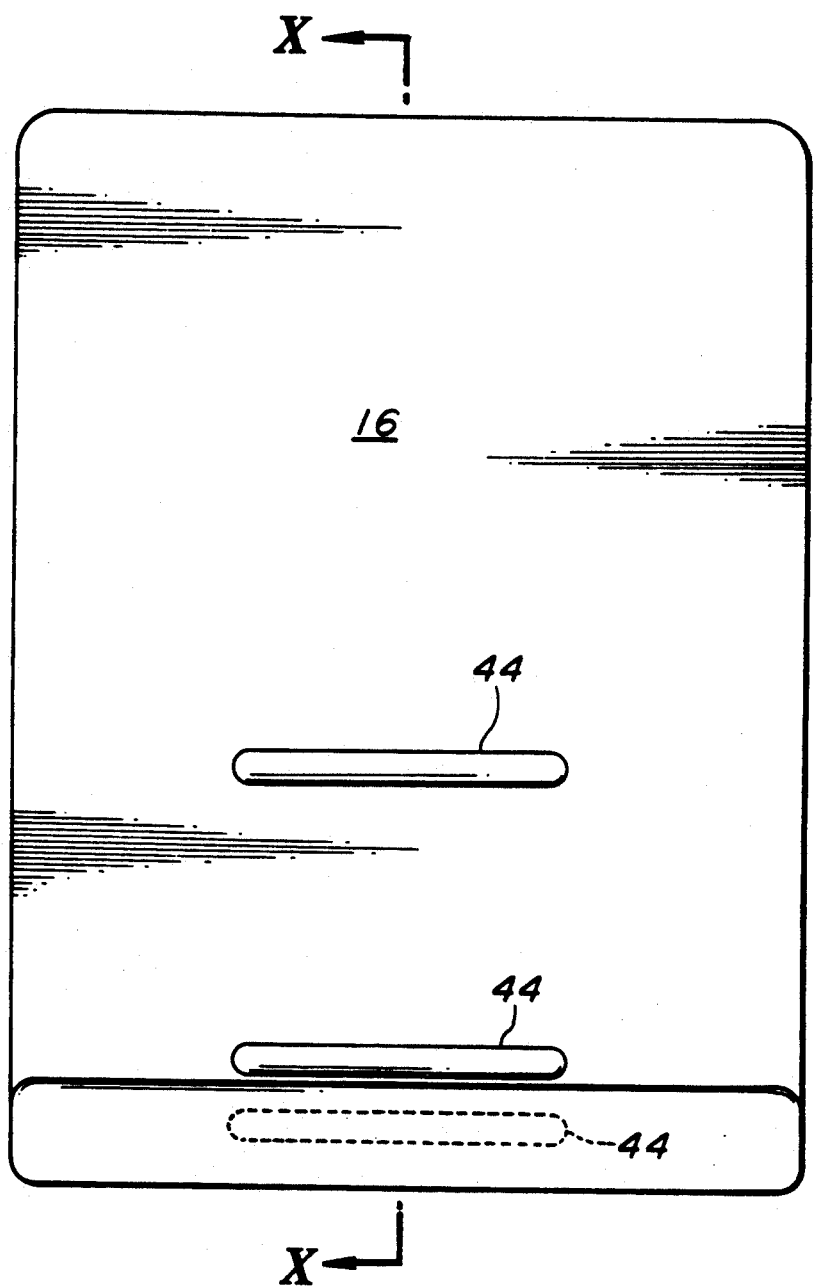
FIG. 3B is a plan view of a pan frame showing the lateral extension of each of the supports of the coccygeal vertebra movement restrainer.
Figure 3C:
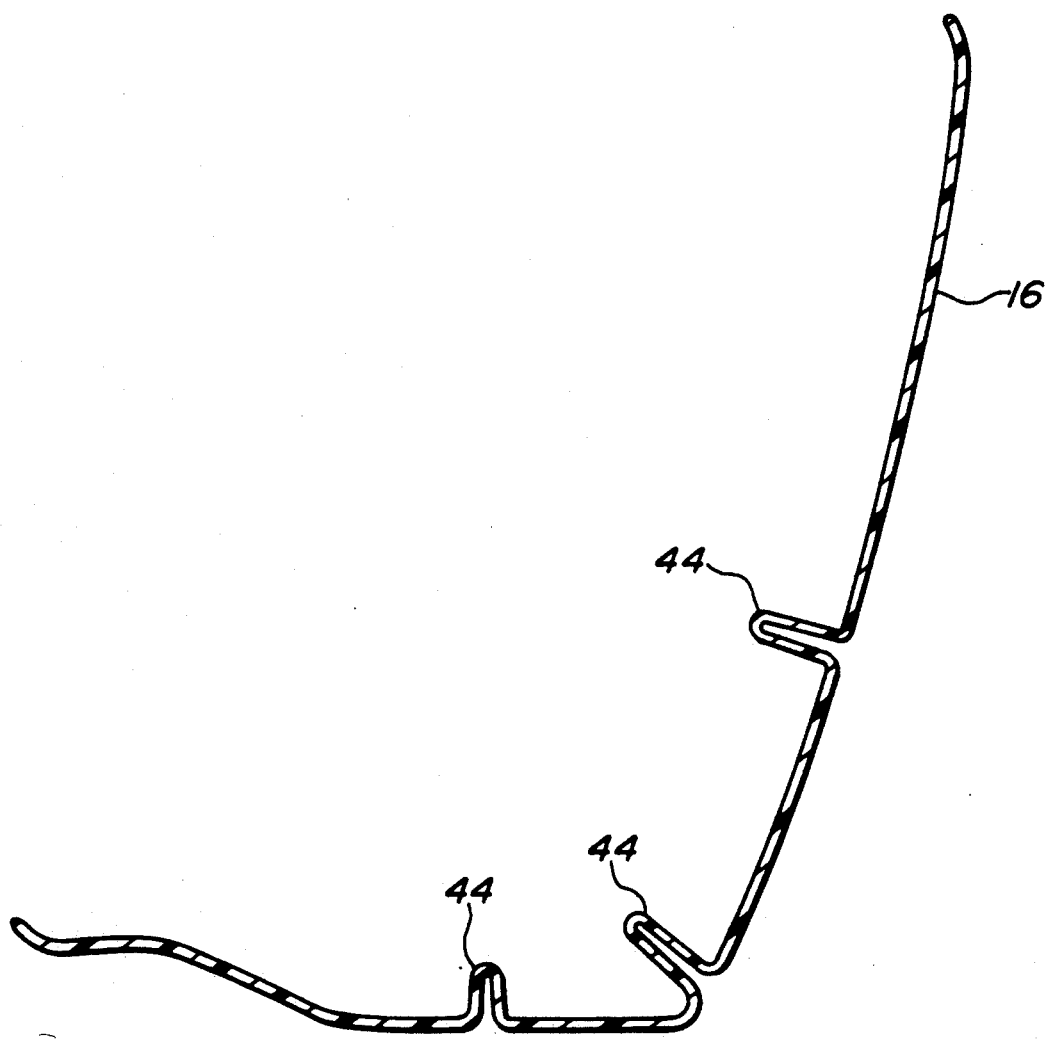
FIG. 3C is a section through the line X—X in FIG. 3B.

FIG. 3A is a perspective view of a seat including a coccygeal vertebra movement restrainer including three supports 44 each in the form of a structure as shown in FIG. 3. As shown in FIG. 3B and 3C, each of the supports 44 extends in a continuous fashion laterally across a portion of either of the seat back and seat cushion.

Figure 3D:
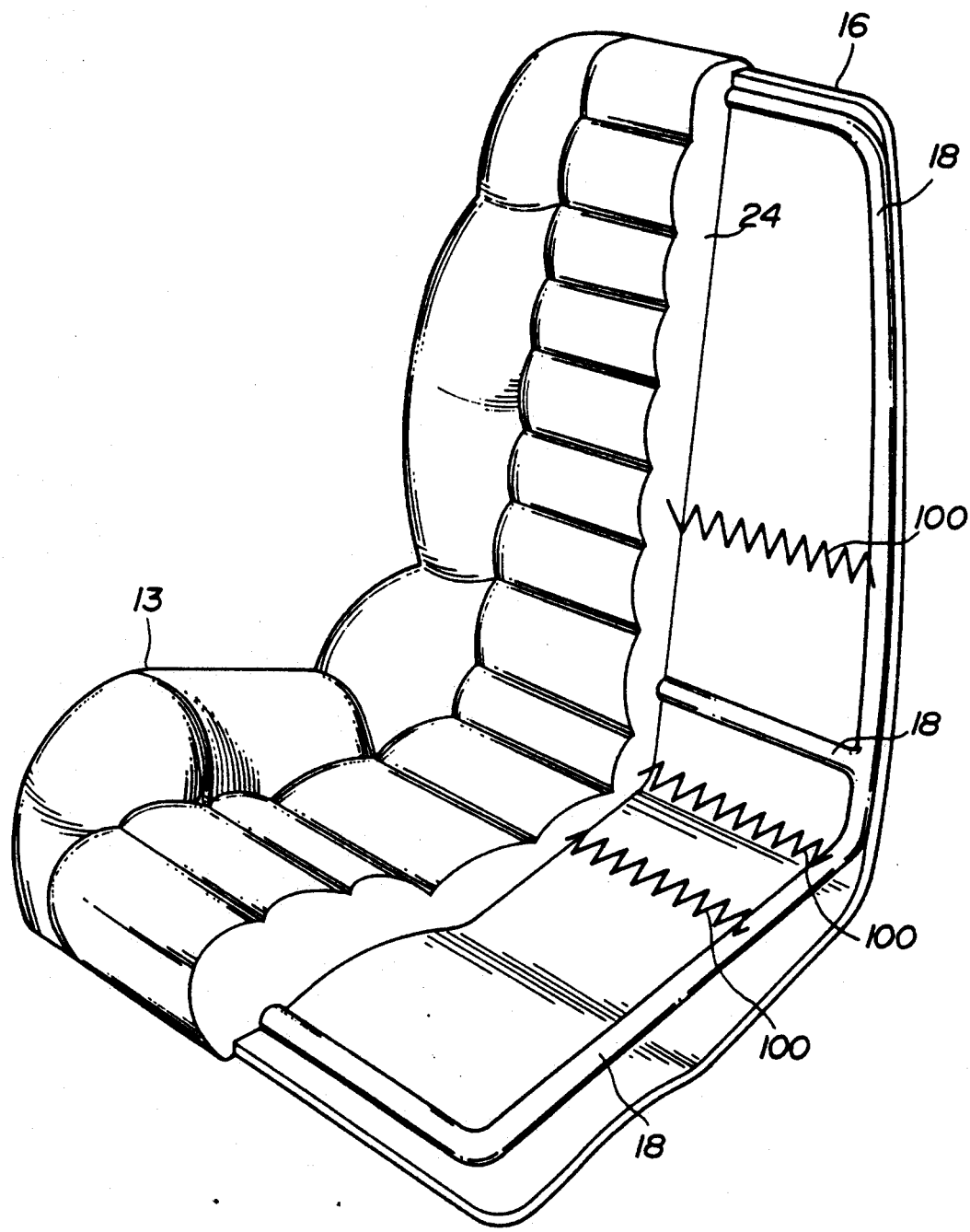
FIG. 3D is a similar view to FIG. 3A showing a coccygeal vertebra movement restrainer employing a plurality of supports each in the form of a suspension spring stretching between two positions of a frame pipe.
Figure 3E:
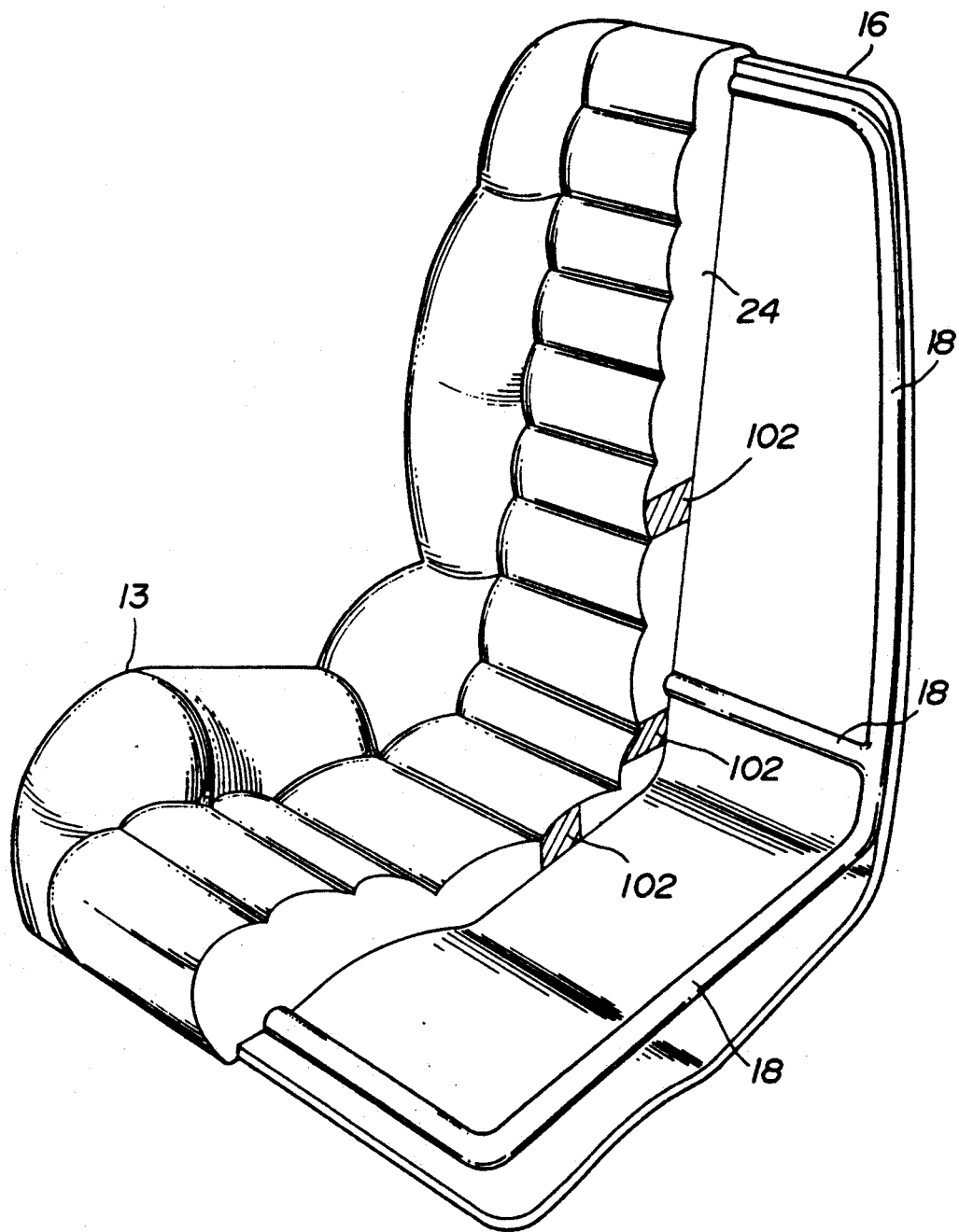
FIG. 3E is a similar view to FIG. 3A showing a coccygeal vertebra movement restrainer including a plurality of supports each in the form of a hardened portion of a pad.

The construction of each support is not limited to this example just described. For example, as shown in FIG. 3D, each of supports of a coccygeal vertebra movement restrainer may be in the form of a suspension spring 100 stretching laterally between two portion of a frame 18. Another alternative is shown in FIG. 3E. In this case, each of supports of a coccygeal vertebra movement restrainer is in the form of a hardened portion 102 of a pad 24.

Referring particularly to FIG. 2, the first to six closed boundaries 30, 32, 34, 36, 38, and 40 mentioned in FIG. 1 are further described.

Among the plurality of supports, the first support is arranged in the pad 24 of the seat back 12 and supports the seat occupant at a portion disposed within an area defined by the first closed boundary. The first closed boundary 30 has a first corner 30a, a second corner 30b, a third corner 30c, and a fourth corner 30d. The first and second corners 30a and 30b are interconnected by a line segment, the second and third corners 30b and 30c are interconnected by a line segment, the third and fourth corners 30c and 30d are interconnected by a line segment, and the fourth and first corner 30d and 30a interconnected by a line segment. The first corner 30a is disposed rearward from the vertical reference line SS by a distance 152 mm and upward from the horizontal reference line SH by a distance 54 mm. The second corner 30b is disposed rearward from the vertical reference line SS by a distance 161 mm and upward from the horizontal reference line SH by a distance 75 mm. The third corner 30c is disposed rearward from the vertical reference line SS by a distance 167 mm and upward from the horizontal reference line SH by a distance 73 mm. The fourth corner 30d is disposed rearward from the vertical reference line SS by a distance 158 mm and upward from the horizontal reference line SH by a distance 52 mm.

The second support is arranged in the pad 24 of the seat cushion 14 and supports the seat occupant at a portion disposed within an area defined by the second closed boundary. The second closed boundary 32 has a first corner 32a, a second corner 32b, a third corner 32c, and a fourth corner 32d. The first and second corners 32a and 32b are interconnected by a line segment, the second and third corners 32b and 32c are interconnected by a line segment, the third and fourth corners 32c and 32d are interconnected by a line segment, and the fourth and first corners 32d and 32a are interconnected by a line segment. The first corner 32a is disposed rearward from the vertical reference line SS by a distance 88 mm and downward from the horizontal reference line SH by a distance 63 mm. The second corner 32b is disposed rearward from the vertical reference line SS by a distance 100 mm and downward from the horizontal reference line SH by a distance 53 mm. The third cover 32c is disposed rearward from the vertical reference line SS by a distance 104 mm and downward from the horizontal reference line SH by a distance 57 mm. The fourth corner 32d is disposed rearward from the vertical reference line SS by a distance 92 mm and downward from the horizontal reference line SH by a distance 67 mm.

The third support is arranged within the pad 24 of the seat cushion 14 and supports the seat occupant at a portion disposed within an area defined by the third closed boundary. The third closed boundary 34 has a first corner 34a, a second corner 34b, a third corner 34c, and a fourth corner 34d. The first and second corners 34a and 34b are interconnected by a line segment, the second and third corners 34b and 34c are interconnected by a line segment, the third and fourth corners 34c and 34d are interconnected by a line segment, and the fourth and first corners 34d and 34a are interconnected by a line segment. The first corner 34a is disposed forward from the vertical reference line SS by a distance 7 mm and downward from the horizontal reference line SH by a distance 65 mm. The second corner 34b is disposed rearward from the vertical reference line SS by a distance 5 mm and downward from the horizontal reference line SH by a distance 67 mm. The third corner 34c is disposed rearward from the vertical reference line SS by a distance 4 mm and downward from the horizontal reference line SH by a distance 77 mm. The fourth corner 34d is disposed forward from the vertical reference line SS by a distance 7 mm and downward from the horizontal reference line SH by a distance 72 mm.

The before-mentioned first support supports the seat occupant also at a portion disposed within a body extending laterally in the opposite directions from the vertical reference plane by a distance 80 mm and having a common cross sectional area which, viewing in the vertical reference plane, has the fourth closed boundary 36. The fourth closed boundary 36 has a first corner 36a, a second corner 36b, a third corner 36c, and a fourth corner 36d. The first and second corners 36a and 36b are interconnected by a line segment, the second and third corners 36b and 36c are interconnected by a line segment, the third and fourth corners 36c and 36d are interconnected by a line segment, and the fourth and first corners 36d and 36a are interconnected by a line segment. The first corner 36a is disposed rearward from the vertical reference line SS by a distance 143 mm and upward from the horizontal reference line SH by a distance 60 mm. The second corner 36b is disposed rearward from the vertical reference line SS by a distance 152 mm and upward from the horizontal reference line SH by a distance 79 mm. The third corner 36c is disposed rearward from the vertical reference line SS by a distance 158 mm and upward from the horizontal reference line SH by a distance 76 mm. The fourth corner 36d is disposed rearward from the vertical reference line SS by a distance 149 mm and upward from the horizontal reference line SH by a distance 56 mm.

The before-mentioned second support supports the seat occupant also at a portion disposed within a body extending laterally in the opposite directions from the vertical reference plane by a distance 80 mm and having a common cross sectional area which, viewing in said vertical reference plane, has the fifth closed boundary 38. The fifth closed boundary 38 has a first corner 38a, a second corner 38b, a third corner 38c, and a fourth corner 38d. The first and second corners 38a and 38b are interconnected by a line segment, the second and third corners 38b and 38c are interconnected by a line segment, the third and fourth corners 38c and 38d are interconnected by a line segment, and the fourth and fifth corners 38d and 38a are interconnected by a line segment. The first corner 38a is disposed rearward from the vertical reference line SS by a distance 84 mm and downward from the horizontal reference line SH by a distance 59 mm. The second corner 38b is disposed rearward from the vertical reference line SS by a distance 95 mm and downward from the horizontal reference line SH by a distance 48 mm. The third corner 38c is disposed rearward from the vertical reference line SS by a distance 99 mm and downward from the horizontal reference line SH by a distance 52 mm. The fourth corner 38d is disposed rearward from the vertical reference line SS by a distance 88 mm and downward from the horizontal reference line SH by a distance 62 mm.

The before-mentioned third support supports the seat occupant also at a portion disposed within a body extending laterally in the opposite directions from the vertical reference plane by a distance 80 mm and having a common cross sectional area which, viewing in the vertical reference plane, has the sixth closed boundary 40 which is substantially the same as the third closed boundary 34. Thus, the sixth closed boundary has first, second, third, and fourth corners 40a, 40b, 40c, and 40d common as the counterparts of the third closed boundary 34.

In FIG. 2, there is shown in broken line a contour of a seat for used in ordinary vehicle.

Figure 4:
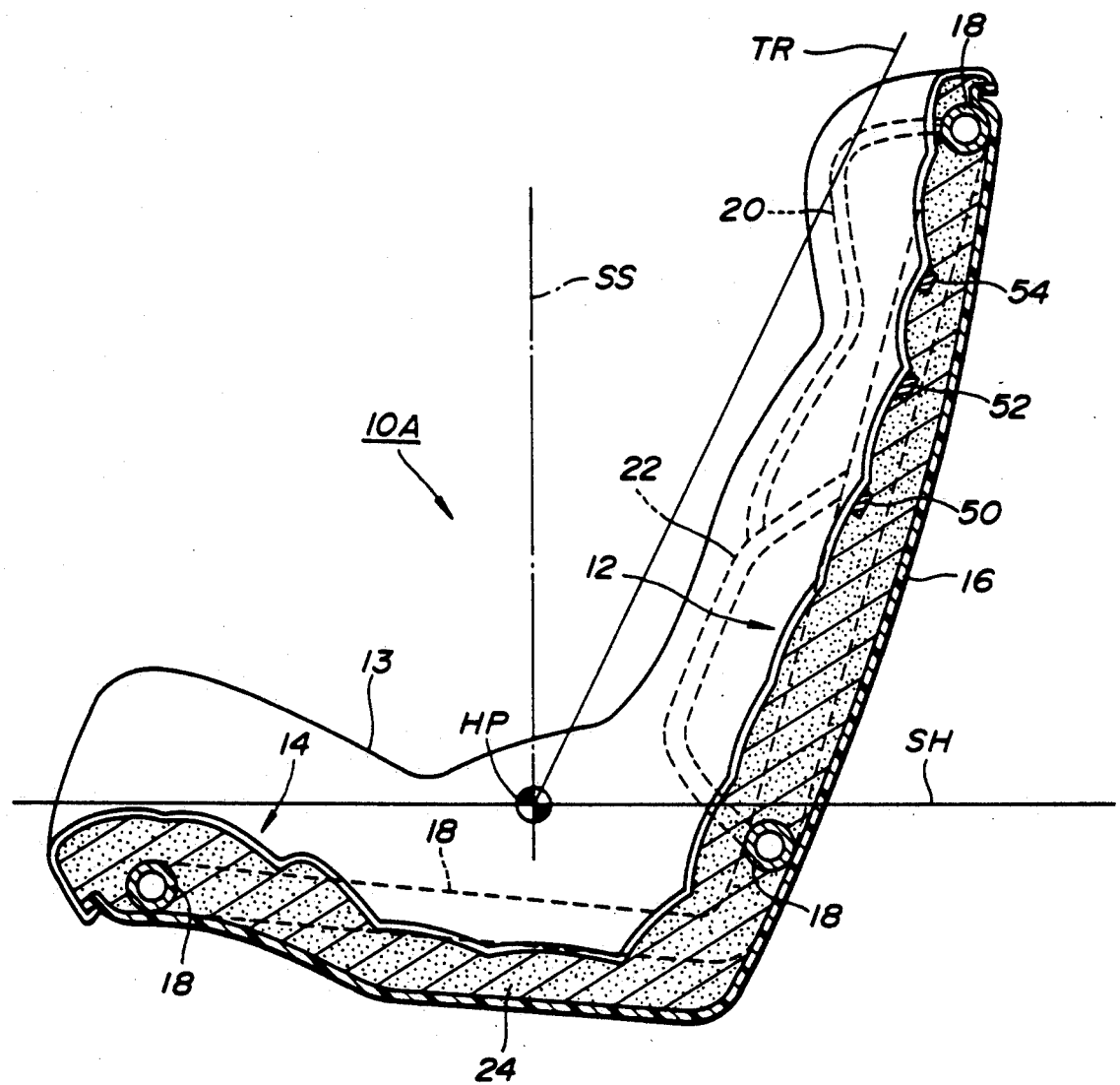
FIG. 4 is a similar section to that shown in FIG. 1 showing a second embodiment according to the present invention.
Figure 5:
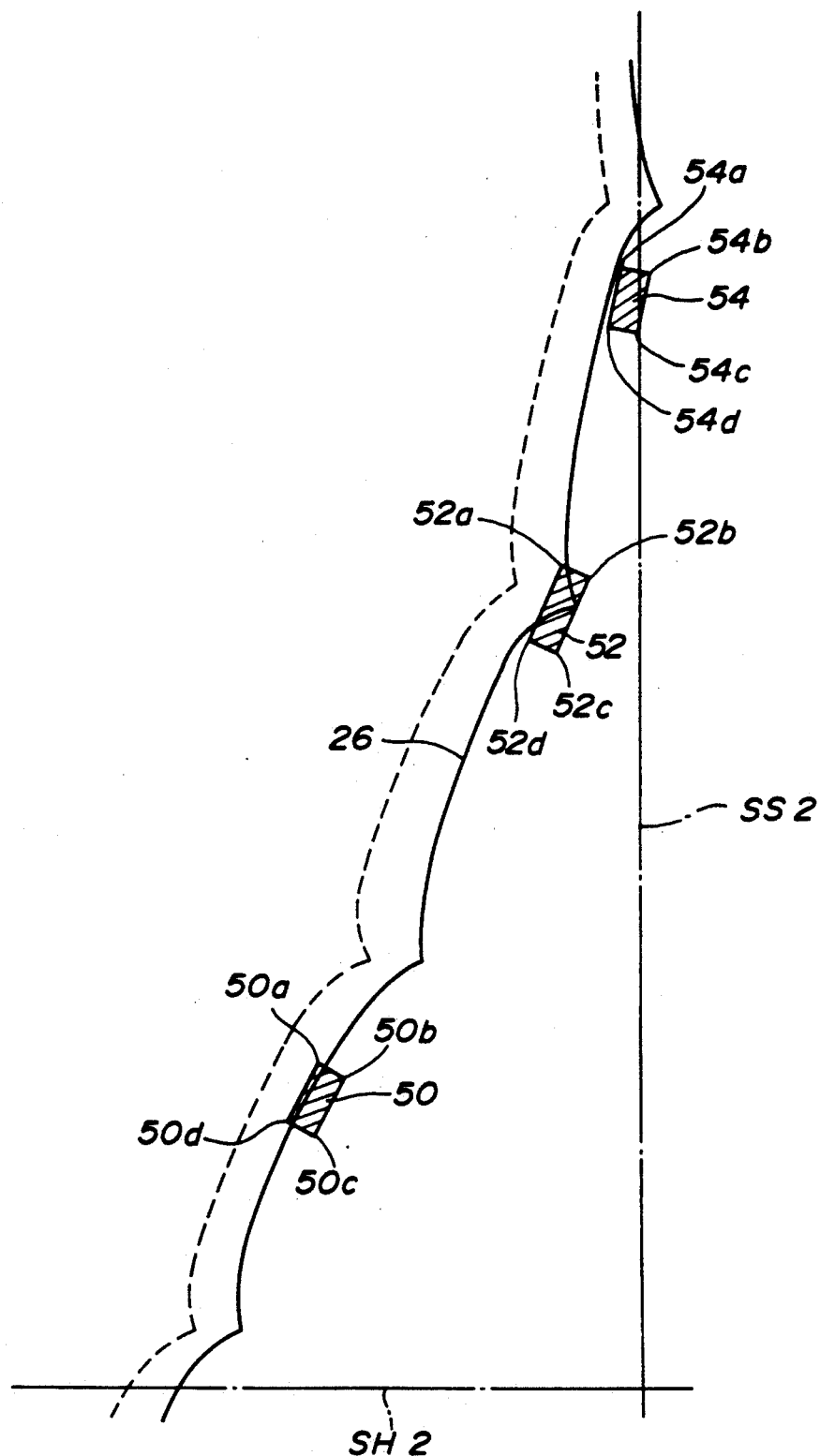
FIG. 5 is an enlarged schematic view of a seat back shown in FIG. 4.
Figure 5A:
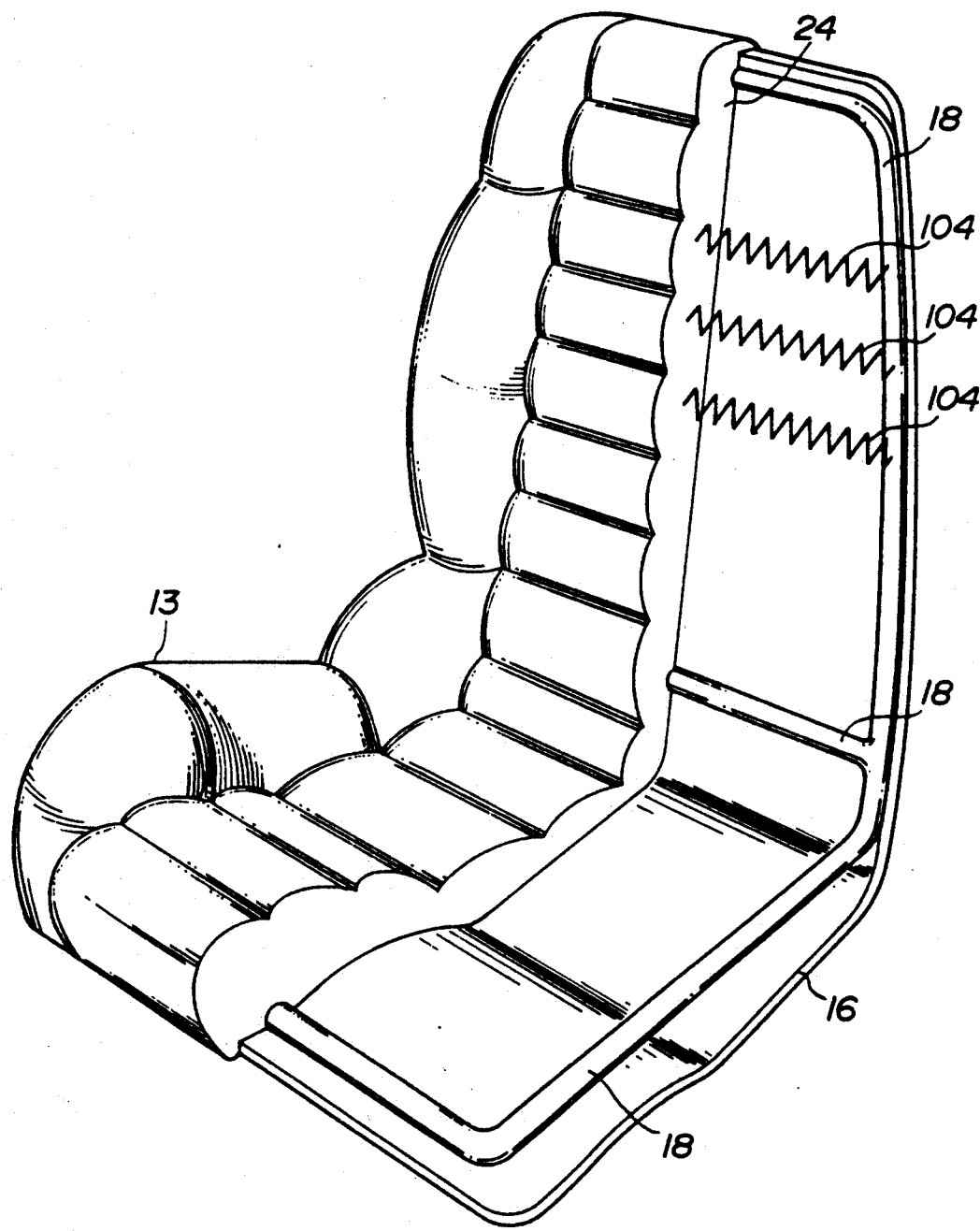
FIG. 5A is a similar perspective view to FIG. 3A showing a coccygeal vertebra movement restrainer including a plurality of rhomboid and posterior inferior serratus supports, each in the form of a suspension spring stretching between two positions of a frame pipe.

Referring to FIGS. 4, 5, and 5A, a second embodiment of a seat 10A is described. This seat 10A is substantially the same as the seat 10. However, the seat 10A is provided with a coccygeal vertebra movement restrainer including a plurality of rhomboid and posterior inferior serratus supports instead of the supports 40 which the seat 10 is provided with.

Each of the rhomboid and posterior inferior serratus supports is in the form of a suspension spring 104 disposed in a pad 24 as shown in FIG. 5A. These suspension springs 104 extend through areas having closed boundaries 50, 52 and 54, and supports the seat occupant at portions disposed within such areas, respectively.

The rhomboid and posterior inferior serratus supports are arranged in the seat back 12 for supporting rhomboids and posterior inferior serratus supports of the seat occupant. They may be divided into three, namely first, second and third.

The closed boundaries 50, 52, and 54 are further described with reference to FIG. 5. In FIG. 5, there are illustrated a second vertical reference line SS2 displaced rearward from the vertical reference line SS by 300 mm, and a second horizontal reference line SH2 displaced upward from the horizontal reference line SH2 by 200 mm.

Among the plurality of rhomboid and posterior inferior serratus supports, the first support is arranged in the pad 24 of the seat back 12 and support the seat occupant at a portion disposed within an area which, viewing in the vertical reference plane involving a hip point HP of the seat occupant, has the first closed boundary 50. The first closed boundary 50 has a first corner 50a, a second corner 50b, a third corner 50c, and a fourth corner 50d.

The first corner 50a is disposed rearward from the vertical reference line SS by a distance 234 mm and upward from a horizontal reference line SH intersecting said vertical reference line at said hip point by a distance 262 mm. The second corner 50b is disposed rearward from the vertical reference line SS by a distance 239 mm and upward from said horizontal reference line SH by a distance 260 mm. The third corner 50c is disposed rearward from the vertical reference line SS by a distance 234 mm and upward from the horizontal reference line SH by a distance 249 mm. The fourth corner 50d is disposed rearward from the vertical reference line SS by a distance 229 mm and upward from the horizontal reference line SH by a distance 251 mm. The first and second corners 50a and 50b are interconnected by a line segment, the second and third corners 50b and 50c are interconnected by a line segment, the third and fourth corners 50c and 50d are interconnected by a line segment, and the fourth and first corners 50d and 50a are interconnected by a line segment.

The second support is arranged in the pad 24 of the seat occupant 12 and support the seat occupant at a portion disposed within an area which has the second closed boundary 52. The second closed boundary 52 has a first corner 52a, a second corner 52b, a third corner 52c, and a fourth corner 52d. The first corner 52a is disposed rearward from the vertical reference line SS by a distance 282 mm and upward from the horizontal reference line SH by a distance 323 mm. The second corner 52b is disposed rearward from the vertical reference line SS by a distance 286 mm and upward from the horizontal reference line SH by a distance 321 mm. The third corner 52c is disposed rearward from the vertical reference line SS by a distance 280 mm and upward from the horizontal reference line SH by a distance 306 mm. The fourth corner 52d is disposed rearward from the vertical reference line SS by a distance 275 mm and upward from the horizontal reference line SH by a distance 308 mm. The first and second corners 52a and 52b are interconnected by a line segment, and the third and fourth corners 52c and 52d are interconnected by a line segment. However, the second and third corners 52b and 52c are interconnected by a curved line segment, and the fourth and first corners 52d and 52a are interconnected by a curved line segment. These curved line segments has a radius of curvature of 320 mm.

The third support is arranged within the pad 24 of the seat back 12 and supports the seat occupant at a portion within an area which has the third closed boundary 54. The third closed boundary has a first corner 54a, a second corner 54b, a third corner 54c, and a fourth corner 54d. The first corner 54a is disposed rearward from the vertical reference line SS by a distance 292 mm and upward from the horizontal reference line SH by a distance 379 mm. The second corner 54b is disposed rearward from the vertical reference line SS by a distance 298 mm and upward from the horizontal reference line SH by a distance 378 mm. The third corner 54c boundary being disposed rearward from the vertical reference line SS by a distance 296 mm and upward from the horizontal reference line SH by a distance 367 mm. The fourth corner 54d is disposed rearward from the vertical reference line SS by a distance 291 mm and upward from the horizontal reference line SH by a distance 368 mm. The first and second corners 54a are interconnected by a line segment, and the third and fourth corners 54c and 54d are interconnected by a line segment. However, the second and third corners 54b and 54c are interconnected by a curved line segment, and the fourth and first corners are interconnected by a curved line segment. These curved line segments have a common radius of curvature 320 mm.

In FIG. 5, the broken line drawn curve shows a contour of a seat back for use in an ordinary vehicle.

Figure 6:
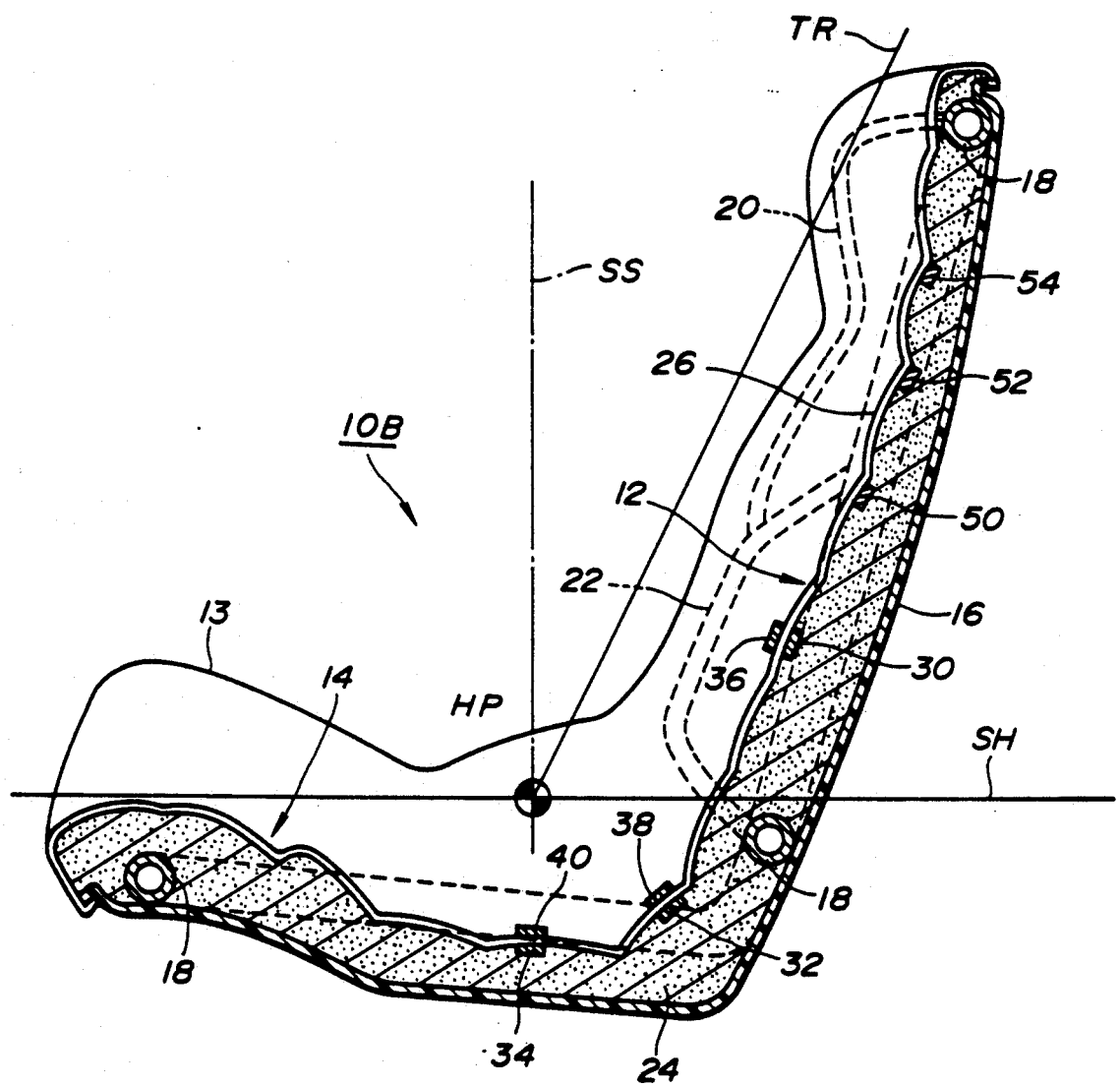
FIG. 6 is a similar section to that shown in FIG. 1 showing a third embodiment according to the present invention.

Referring to FIG. 6, a third embodiment of a seat 10B is illustrated. This embodiment is a combination of the first embodiment shown in FIG. 1 with the second embodiment shown in FIG. 4.

Figure 6A:
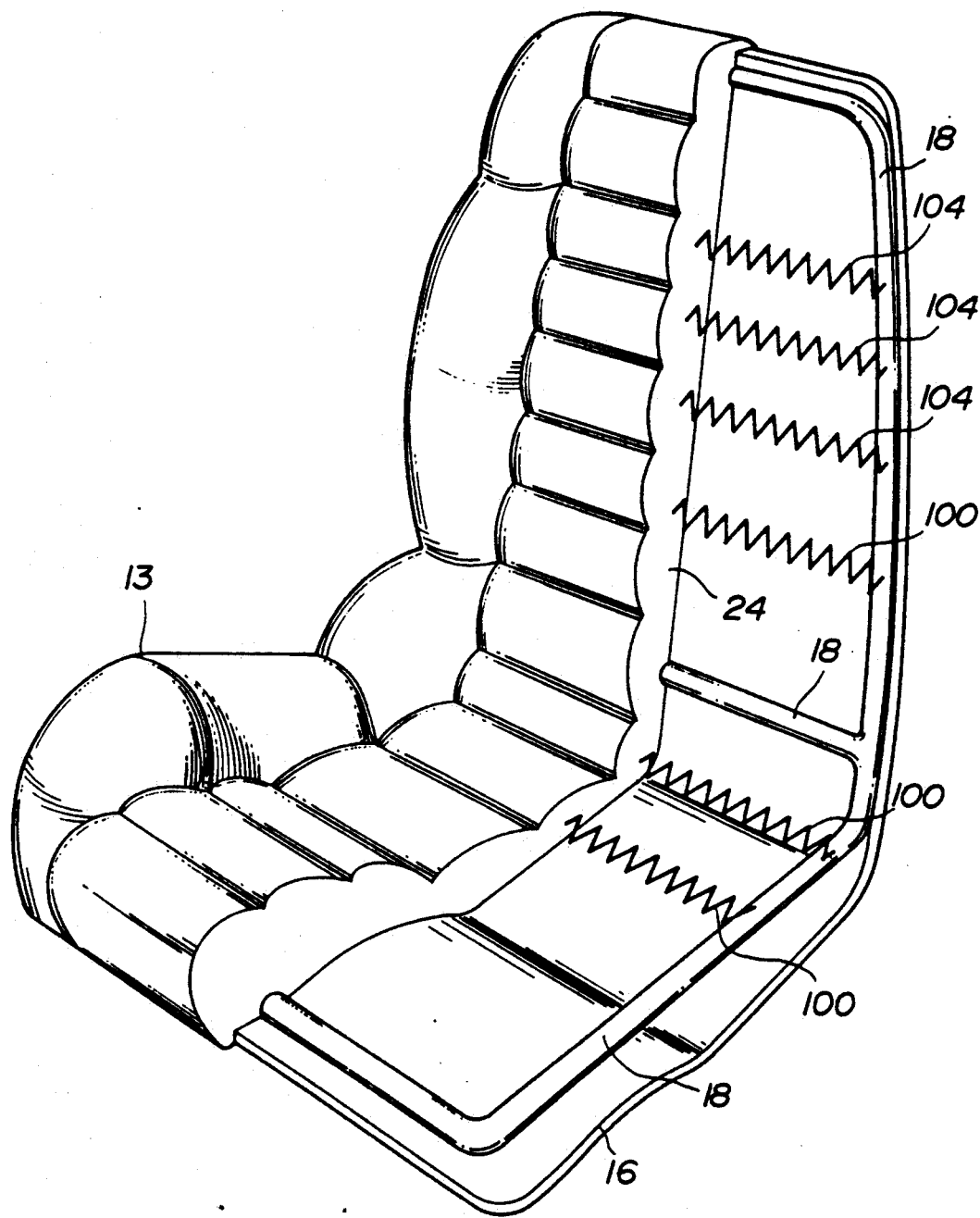
FIG. 6A is a similar perspective view to FIG. 3A showing a coccygeal vertebra movement restrainer including a plurality of supports each in the form of a suspension spring.
Figure 6B:
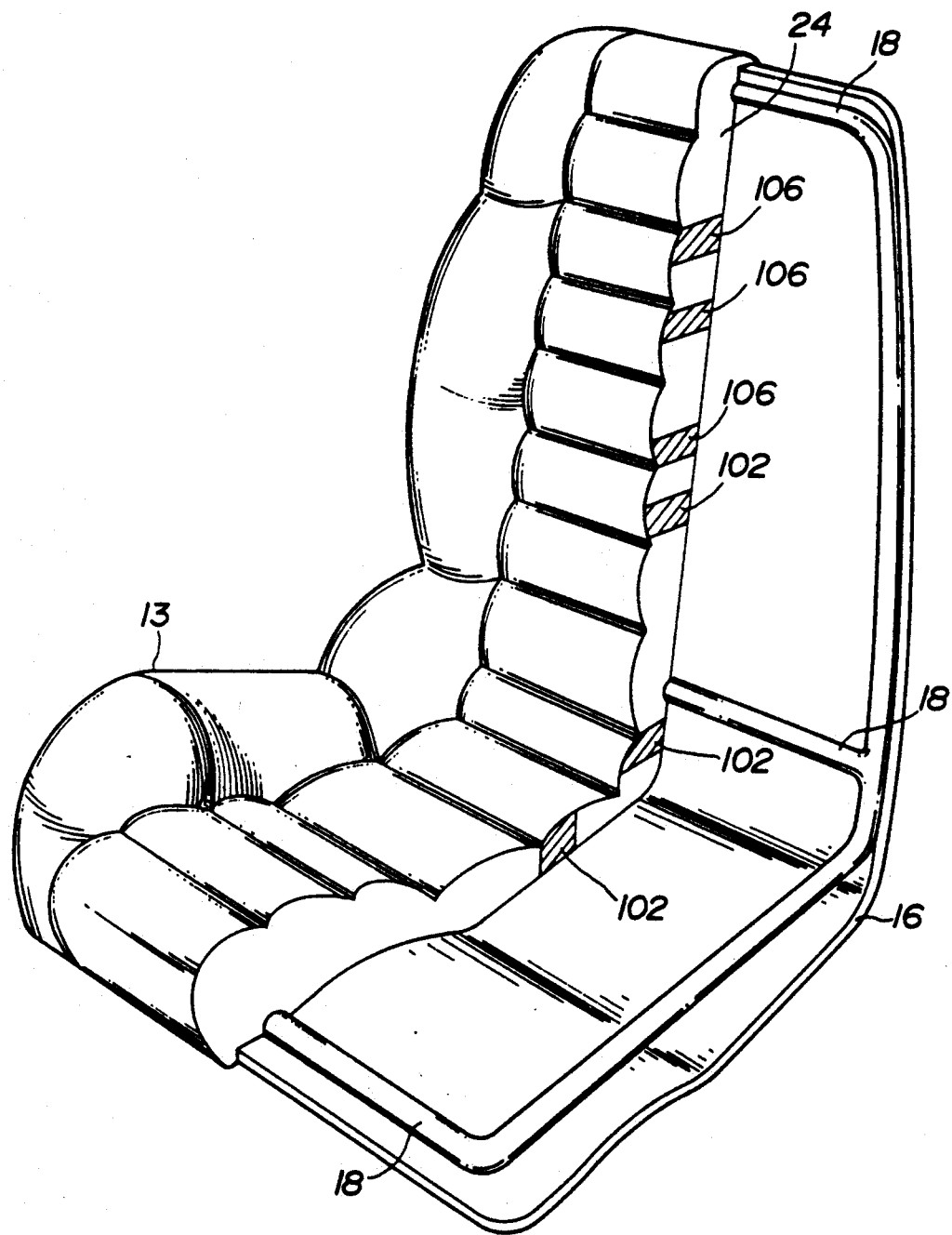
FIG. 6B is a similar view to FIG. 6A showing a coccygeal vertebra movement restrainer including a plurality of supports each in the form of a hardened portion of a pad.

Each of the supports may be in the form of a suspension spring 100 or 104 as shown in FIG. 6A or in the form of a hardened portion 102 or 106 of a pad 24 as shown in FIG. 6B.

As will now be appreciated from the preceding description, the hip point HP of the seat occupant is prevented from slipping relative to the seat cushion by the coccygeal vertebra movement restrainer including coccygeal vertebra supports 44 or 100 or 102 and/or rhomboids and posterior inferior serratus supports 104 or 106. With the coccygeal vertebra supports, movements of a coccygeal vertebra of a spine of the seat occupant are restrained. With the rhomboids and posterior inferior serratus supports, upward movement of shoulders of the seat occupant upon the vehicle being subject to a rapid acceleration is restrained so that the movement of the coccygeal vertebra of the seat occupant is effectively restrained.

Therefore, a seat according to the present invention supports a seat occupant comfortably without causing him/her to feel fatigue during a long crusing drive.

Figure 7:
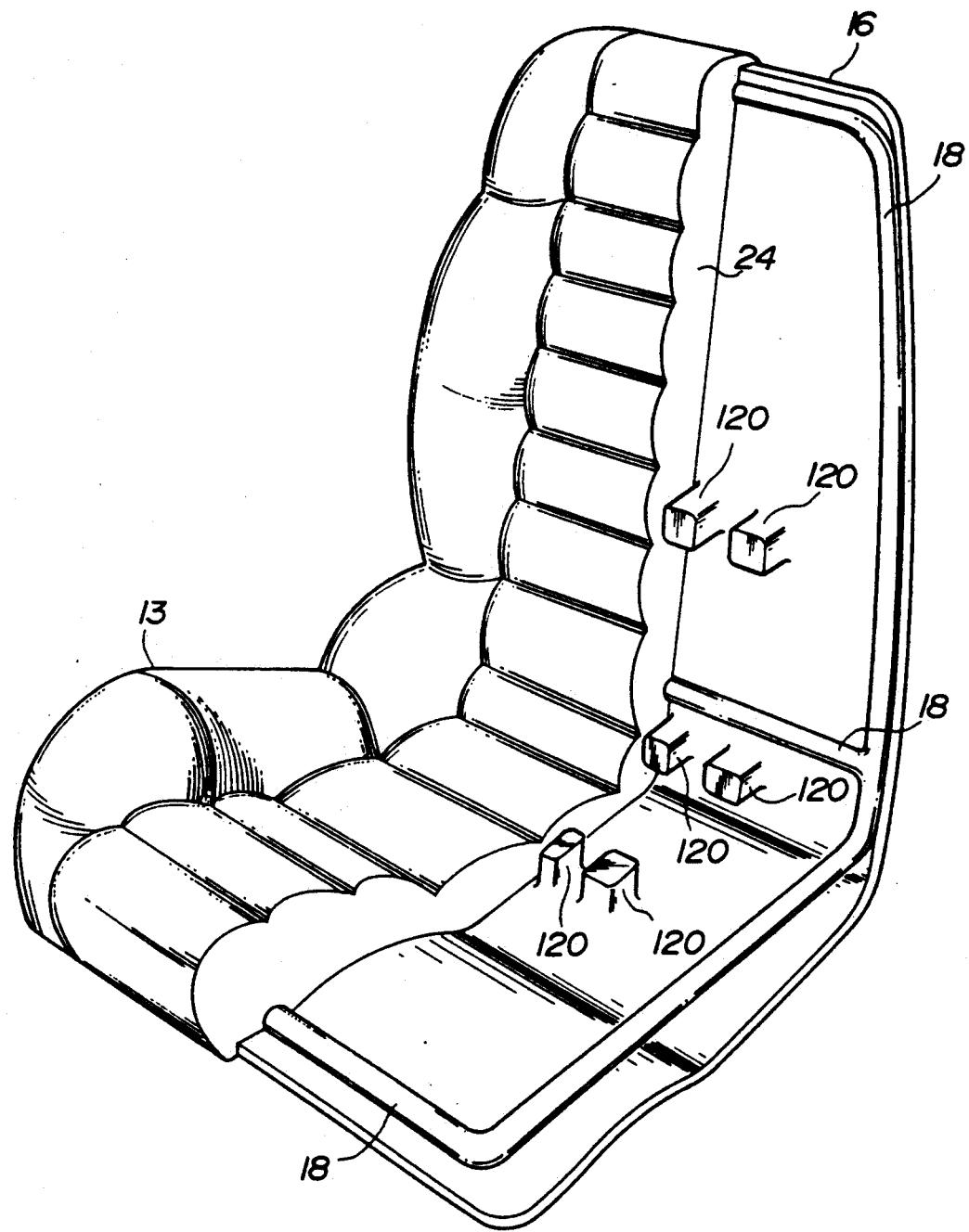
FIG. 7 is a similar view to FIG. 3A showing a coccygeal vertebra movement restrainer including a plurality of supports each in the form of a plurality of protrusions arranged in a row.

Although in the previous description, each of the supports extends in a continuous fashion laterally across a portion of the seat, it is not necessary to use a support extending continuously in a strict sense. FIG. 7 shows a seat including a coccygeal vertebra movement restrainer including three support each including an array of a plurality of spaced projections 120. In this case, the projections 120 of each array is spaced but arranged to support the appropriate portion of the seat occupant in a substantial continuous manner. Thus, each of the supports used in the coccygeal vertebra support shown in FIG. 7 extends in a substantially continuous fashion laterally across a portion of the seat.

What is claimed is:

1. A seat for supporting a seat occupant in a vehicle, comprising:
   a seat back;
   a seat cushion which said seat back extends from; and
   a coccygeal vertebra movement restrainer which includes a plurality of fixed supports, each extending in a substantially continuous fashion laterally across a portion of either of said seat back and seat cushion so as to restrain movement of a coccygeal vertebra of the spine of the seat occupant relative to said seat cushion,
   wherein said plurality of supports of said coccygeal vertebra movement restrainer include a first support, a second support, and a third support which are so constructed and arranged as to support a waist portion, a portion adjacent the coccygeal vertebra, and thighs of the seat occupant,
   wherein said first support is arranged within said seat back and supports the seat occupant at a portion disposed within an area which, viewing in a vertical reference plane involving a hip point of the seat occupant, has a first closed boundary with a first corner, a second corner, a third corner, and a fourth corner,
   said first corner being disposed rearward from a vertical reference line including said hip point by a distance 152 mm and upward from a horizontal reference line intersecting said vertical reference line at said hip point by a distance 54 mm,
   said second corner being disposed rearward from said vertical reference line by a distance 161 mm and upward from said horizontal reference line by a distance 75 mm,
   said third corner being disposed rearward from said vertical reference line by a distance 167 mm and upward from said horizontal reference line by a distance 73 mm,
   said fourth corner being disposed rearward from said vertical reference line by a distance 158 mm and upward from said horizontal reference line by a distance 52 mm;
   said second abutment is arranged in said seat cushion and supports the seat occupant at a portion disposed within an area which, viewing in said vertical reference plane, has a second closed boundary with a first corner, a second corner, a third corner, and a fourth corner,
   said first corner of said second closed boundary being disposed rearward from said vertical reference line by a distance 88 mm and downward from said horizontal reference line by a distance 63 mm,
   said second corner of said second closed boundary being disposed rearward from said vertical reference line by a distance 100 mm and downward from said horizontal reference line by a distance 53 mm,
   said third corner of said second closed boundary being disposed rearward from said vertical reference line by a distance 104 mm and downward from said horizontal reference line by a distance 57 mm,
   said fourth corner of said second closed boundary being disposed rearward from said vertical reference line by a distance 92 mm and downward from said horizontal reference line by a distance 67 mm;
   said third support is arranged in said seat cushion and supports the seat occupant at a portion within an area which, viewing in said vertical reference plane, has a third closed boundary with a first corner, a second corner, a third corner, and a fourth corner,
   said first corner of said third closed boundary being disposed forward from said vertical reference line by a distance 7 mm and downward from said horizontal reference line by a distance 65 mm, said second corner of said third closed boundary being disposed rearward from said vertical reference line by a distance 5 mm and downward from said horizontal reference line by a distance 67 mm, said third corner of said third closed boundary being disposed rearward from said vertical reference line by a distance 4 mm and downward from said horizontal reference line by a distance 77 mm, said fourth corner of said third closed boundary being disposed forward from said vertical reference line by a distance 7 mm and downward from said horizontal reference line by a distance 72 mm;

said first support supports the seat occupant at a portion disposed within a body extending laterally in the opposite directions from said vertical reference plane by a distance 80 mm and having a common cross sectional area which, viewing in said vertical reference plane, has a fourth closed boundary with a first corner, a second corner, a third corner, and a fourth corner, said first corner of said fourth closed boundary being disposed rearward from said vertical reference line by a distance 143 mm and upward from said horizontal reference line by a distance 60 mm, said second corner of said fourth closed boundary being disposed rearward from said vertical reference line by a distance 152 mm and upward from said horizontal reference line by a distance 79 mm, said third corner of said fourth closed boundary being disposed rearward from said vertical reference line by a distance 158 mm and upward from said horizontal reference line by a distance 76 mm, said fourth corner of said fourth closed boundary being disposed rearward from said vertical reference line by a distance 149 mm and upward from said horizontal reference line by a distance 56 mm;

said second support supports the seat occupant at a portion disposed within a body extending laterally in the opposite directions from said vertical reference plane by a distance 80 mm and having a common cross sectional area which, viewing in said vertical reference plane, has a fifth closed boundary with a first corner, a second corner, a third corner, and a fourth corner, said first corner of said fifth closed boundary being disposed rearward from said vertical reference line by a distance 84 mm and downward from said horizontal reference line by a distance 59 mm, said second corner of said fifth closed boundary being disposed rearward from said vertical reference line by a distance 95 mm and downward from said horizontal reference line by a distance 48 mm, said third corner of said fifth closed boundary being disposed rearward from said vertical reference line by a distance 99 mm and downward form said horizontal reference line by a distance 52 mm, said fourth corner of said fifth closed boundary being disposed rearward from said vertical reference line by a distance 88 mm and downward from said horizontal reference line by a distance 62 mm; and said third support supports the seat occupant at a portion disposed within a body extending in the opposite directions from said vertical reference plane by a distance 80 mm and having a common cross sectional area which, viewing in said vertical reference plane, has substantially the same closed boundary as said third closed boundary.

* * * * *